United States Patent Office 3,171,404
Patented Mar. 2, 1965

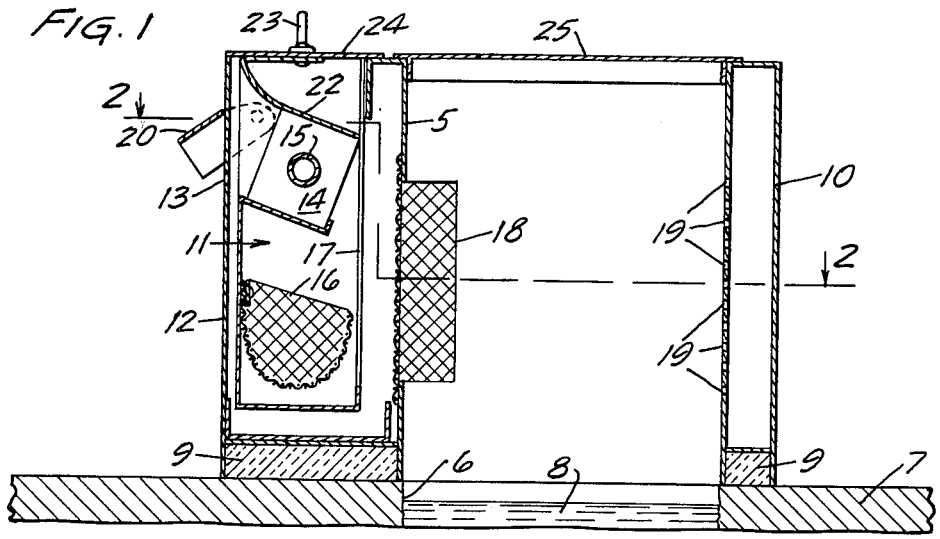
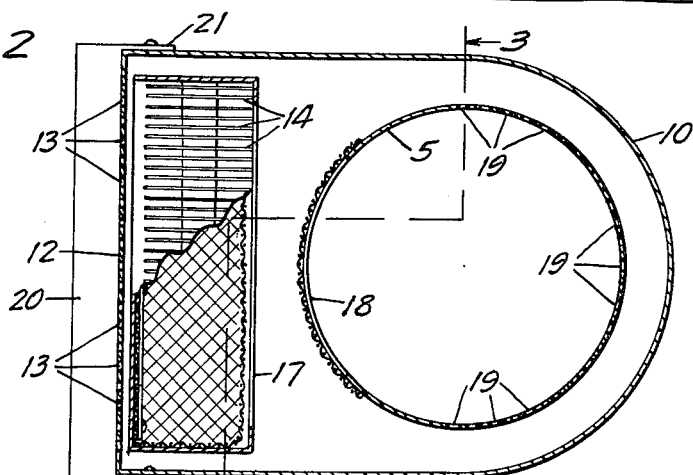
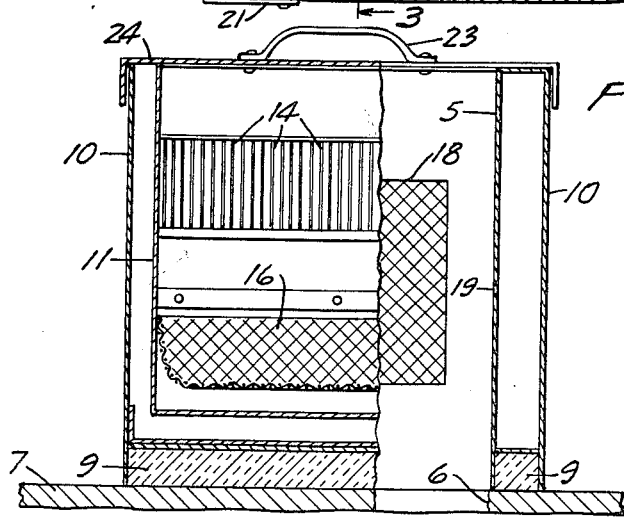

3,171,404
HEATING DEVICE FOR ICE FISHING
Jack W. Skog, 3500 Emerald Drive,
White Bear Lake, Minn.
Filed May 14, 1963, Ser. No. 280,317
6 Claims. (Cl. 126—271.3)

This invention relates to a device for maintaining the water in a fishing hole free of ice in extremely cold weather.

The principal objects of my invention are:

(a) To provide a compact, efficient heating device of the class described whereby freezing of the water in a fishing hole is prevented by heated air currents;

(b) To provide improved means for causing the circulation of air through a heating chamber and into and down through an open ended tubular member which is supported on ice surrounding a fishing hole;

(c) To prevent the sinking or settling of the heating device into the ice, and (d) To provide a compact, efficient heat exchanger through which air is blown in its passage to the interior of the tubular well through which a fishing line is passed.

Other objects will appear and be more fully pointed out in the following specification and claims.

Referring to the accompanying drawing, which illustrates, by way of example and not for the purpose of limitation, a preferred embodiment of my invention:

FIGURE 1 is a central vertical sectional view through my improved heating device;

FIG. 2 is a horizontal sectional view taken approximately on the line 2—2 of FIG. 1, and FIG. 3 is a vertical sectional view taken approximately on the line 3—3 of FIG. 2.

As shown in the drawing, my device has a normally open ended, vertical, tubular wall 5 or well adapted to extend above a fishing hole 6 cut through ice 7 on a body of water. The hole 6 provides a generally circular area 8 of open water which must be prevented from freezing. The tubular wall 5 is supported on a base 9 of heat insulating material which prevents the melting of the ice by the heated walls of the device and resulting settling of the device into the ice.

Spaced from and surrounding the wall 5 is an outer casing 10. This casing has an enlargement projecting at one side of the wall 5 to provide a heating chamber indicated generally by the numeral 11. A plane vertical wall 12 of the casing 10 is formed with a multiplicity of air intake openings 13 disposed to direct air into and through the heating chamber. The device is normally placed with the outer side of the wall 12 facing up-wind so that the natural air currents have the maximum effect in forcing air into and through the heater. From the openings 12 the air passes through a heat exchanger comprising a multiplicity of parallel fins 14 supported on a horizontal member 15 secured to the end walls of the heating unit.

Mounted in the lower portion of the heating unit 11 is a foraminous container 16 for solid fuel, e.g., charcoal. The heat exchanger is located directly above and extends the entire length of the fuel container 16 so that efficient use is made of the heat generated by the burning fuel. An open side 17 of the heating unit is disposed adjacent to the wall 5, and the latter has a mesh covered opening 18 providing passages disposed to receive heated air from the heating unit 11. Heated air also passes between the casing 10 and well 5 to the side of the latter remote from the heating unit. Heated air also enters the central well through a multiplicity of openings 19 formed therein.

Projecting outwardly from the wall 12 at an elevation above the openings 13 therein is a wind or air deflector 20 which directs air impinging against the wall 12 into and through the openings 13. Hinge members 21 project from the ends of the deflector 20 and are pivotally connected to the outer casing 10 so that the deflector 20 may be retracted to overlie the wall 12 and close the openings 13 when not in use. A fixed deflector 22 extends obliquely down and inwardly from the wall 12 toward the open side 17 of the heating chamber to direct air from the heat exchanger obliquely downward to and through passages formed by the mesh covered opening 18 and thence downwardly to the water in the hole 6.

The heating unit, including the fuel container 16 and heat exchanger are readily removable from the top of the casing 10 being provided with a handle 23 secured to the top closure 24 of the heating unit. A readily removable cap 25 is provided for the normally open upper end of the tubular wall 5 for use when the device is to be used as a carrying case and also for use in temporarily increasing the heating effect of the device on the water in the hole 6.

In preparing the device for use, the fishing hole 6 may be cut in the ice 7 in the usual manner at the site for the fishing. The heating unit 11 is removed from the outer casing 10, by the use of the handle 23, and suitable fuel is charged into the container 16 and ignited. The heating unit is then replaced in the chamber in the outer casing 10 and the tubular wall or well 5 is placed over the hole 6 with the vertical wall 12 of the outer casing facing up-wind. The air deflector 20 is then adjusted to direct air into the heating unit through the openings 13 and the cap 25 is removed from the well 5.

Currents of air entering through the openings 13 pass through the heat exchanger comprising the members 14 and 15. The heated air is directed by the deflector 22 through the open side 17 of the heater and mesh covered opening 18 in the central well wherein it flows downwardly against the surface of the water in the area 8 so that freezing is prevented. Heated air also enters the well 5 through the openings 19 therein. Adjustments of the angular position and elevation of the device are minimized by the provision of the heat insulating base 9 which minimizes the effect of the heated outer casing 10 and well 5 in melting the ice upon which the device rests. Heat loss is also thereby reduced.

By utilizing natural air currents to transfer heat by convection to the surface of the water to be kept open, I greatly improve the efficiency of the device and eliminate the need for heating the water below the surface in the fishing hole.

I claim:

1. A heating device for ice fishing comprising an open ended tubular member adapted to extend upwardly about the sides of a fishing hole, means for supporting said tubular member on the ice surrounding said hole, an outer casing having a portion projecting at one side of said tubular member to provide a heating chamber, said casing encompassing and being spaced outwardly from said tubular member and including a top closure for the space between said tubular member and casing, a heating unit contained in said chamber, said heating chamber having a wall opposite said tubular member formed with an air intake opening in the upper portion thereof, said tubular member being formed with air passages disposed at elevations below said air intake opening, and air deflector means disposed to direct air received from said intake opening through said heating chamber and thence through said passages in said tubular member to provide warm air within said member.

2. A heating device in accordance with claim 1 in which said air deflector means are positioned in the upper portion of said heating chamber and extend obliquely downwardly toward the air passages in said tubular member to direct heated air from said heating chamber downwardly toward the water in the ice fishing hole within said tubular member.

3. A heating device in accordance with claim 1 in which said heating unit comprises a fuel burner and a heat exchange unit disposed above said burner to receive air from said intake opening in said casing member and to direct heated air for flow through said passages in said tubular member.

4. A heating device for ice fishing in accordance with claim 1 in which said means for supporting said member on the ice surrounding the hole comprises heat insulating means.

5. A heating device in accordance with claim 1 in which said heating unit is contained in a housing which is readily removable from said outer casing.

6. A heating device in accordance with claim 5 in which said heating unit comprises a solid fuel burner and a heat exchange unit disposed above said burner in said housing.

References Cited in the file of this patent

UNITED STATES PATENTS

| | | |
|---|---|---|
| 838,936 | Bartlebaugh | Dec. 18, 1906 |
| 2,483,787 | Sheraski | Oct. 4, 1949 |
| 2,677,363 | Bryan | May 4, 1954 |
| 2,747,569 | Holm et al. | May 29, 1956 |
| 2,883,784 | Obernolte | Apr. 28, 1959 |
| 3,025,852 | Quilling | Mar. 20, 1962 |
| 3,105,487 | Anderson | Oct. 1, 1963 |